(12) United States Patent
Weaver et al.

(10) Patent No.: US 7,769,146 B1
(45) Date of Patent: Aug. 3, 2010

(54) METHOD AND SYSTEM FOR CONNECTING CALLING AND CALLED PARTIES WHEN CALLED PARTY IS LEAVING MESSAGE FOR CALLING PARTY

(75) Inventors: Farni B. Weaver, Spring Hill, KS (US); Mark R. Bales, Kansas City, KS (US); Anthony J. Wageman, Lee's Summit, MO (US); Arun Santharam, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1127 days.

(21) Appl. No.: 11/417,861

(22) Filed: May 3, 2006

(51) Int. Cl.
*H04M 1/64* (2006.01)
(52) U.S. Cl. .................. 379/88.17; 379/88.12
(58) Field of Classification Search .... 379/88.12–88.17
See application file for complete search history.

(56) References Cited

U.S. PATENT DOCUMENTS

| | | | |
|---|---|---|---|
| 6,389,113 B1 | 5/2002 | Silverman | |
| 6,718,178 B1 | 4/2004 | Sladek et al. | |
| 6,771,742 B2 | 8/2004 | McCalmont et al. | |
| 7,046,140 B2 | 5/2006 | Adamczyk et al. | |
| 7,242,754 B2 * | 7/2007 | Adams et al. | 379/201.02 |
| 7,266,190 B1 * | 9/2007 | Mullis et al. | 379/211.02 |
| 7,317,714 B2 * | 1/2008 | Roberts et al. | 370/352 |
| 2003/0035381 A1 | 2/2003 | Chen et al. | |
| 2004/0037402 A1 * | 2/2004 | Adamczyk et al. | 379/88.22 |
| 2005/0123105 A9 * | 6/2005 | Holt et al. | 379/88.17 |
| 2006/0245570 A1 | 11/2006 | Pfleging et al. | |
| 2007/0121799 A1 | 5/2007 | Binning | |

OTHER PUBLICATIONS

U.S. Appl. No. 11/175,916, filed Jul. 6, 2005.
Office Action from U.S. Appl. No. 11/175,916, dated Nov. 5, 2008.
Office Action from U.S. Appl. No. 11/175,916, dated Apr. 1, 2009.
Office Action from U.S. Appl. No. 11/175,916, dated Sep. 24, 2009.

* cited by examiner

*Primary Examiner*—Curtis Kuntz
*Assistant Examiner*—Mohammad K Islam

(57) ABSTRACT

A method and system for automatically connecting a calling party with a called party when the called party is leaving a message for the calling party. When first person is attempting to call a second person at the same time as the second person is leaving a voice mail message for the first person, a network system will determine that the second person is leaving the voice mail message for the first person and will responsively engage in call control signaling to disconnect the second person from the voice mail server and to instead set up a call between the first person and the second person. Once the call is set up between the first person and the second person, the first person and the second person may then conveniently talk with each other.

20 Claims, 5 Drawing Sheets

METHOD AND SYSTEM FOR CONNECTING CALLING AND CALLED PARTIES WHEN CALLED PARTY IS LEAVING MESSAGE FOR CALLING PARTY

FIELD OF THE INVENTION

The present invention relates to telecommunications and, more particularly, to call setup processes.

BACKGROUND

At times, it may happen that a person (caller) will attempt to call another person (called party) at the same time that the called party is leaving a voice mail message for the caller. When that happens, the called party's line may be busy or the caller's call may otherwise go unanswered by the called party. Consequently, the calling party will likely be connected to the called party's voice mail. This scenario is clearly inconvenient, because the calling party may end up leaving a voice mail message for the called party when the called party is leaving (or has just left) a voice mail message for the calling party. Thus, although the two people are trying to contact each other at the same time, they may both end up leaving messages for each other and ultimately both need to listen to each other's messages and call each other back.

SUMMARY

The present invention provides a method and system for automatically or semi-automatically connecting a calling party with a called party when the called party is leaving a message for the calling party. The invention may be implemented in a network system comprising a session manager, voice mail server, and/or one or more other entities. In practice, when first party is attempting to call a second party at the same time as the second party is leaving a voice mail message for the first party, the network system will determine that the second party is leaving the voice mail message for the first party and will responsively engage in call control signaling to disconnect the second party from the voice mail server and to instead set up a call between the parties. In a preferred embodiment, the call control signaling will comprise Session Initiation Protocol (SIP) signaling, but it could take other forms as well, including ISDN User Part (ISUP) signaling for instance. Once the call is set up between the parties, the parties may then conveniently talk with each other.

In one respect, an exemplary embodiment of the invention may thus take the form of a method that includes (i) detecting that a first party is attempting to call a second party while the second party is leaving a voice mail message at a voice mail server for the first party and (ii) responsively engaging in a call control process comprising disconnecting the second party from the voice mail server and connecting the first party with the second party. In this process, the detecting function occurs before any notification of the voice mail message is sent to the first party, and indeed it is possible that no notification message may be sent at all.

In another respect, the exemplary embodiment may take the form of a method that involves (i) connecting party A with a voice mail server to allow A to leave a voice mail message for a party B, and beginning to receive the voice mail message from A into the voice mail server, (ii) while A is leaving the voice mail message for B, receiving a call origination message (such as a Session Initiation Protocol (SIP) INVITE message) indicating that B is attempting to call A, wherein the call origination message is generated by B without B first receiving a notification of the voice mail message, and (iii) in response to a determination that B is originating a call to A while A is leaving the voice mail message for B, engaging in a call control process comprising connecting B with A.

The call control process may further comprise disconnecting A from the voice mail server, possibly after first playing an announcement to A, such as a voice announcement explaining that A and B are about to be connected. In addition, the call control process may further comprise deleting at least a portion of the voice mail message from the voice mail server, to avoid having a notification of the voice mail message be sent to B (as might normally occur once A finishes leaving the voice mail message for B).

The function of receiving the call origination message indicating that B is attempting to call A may involve intercepting the call origination message at a session management server (perhaps one through which such a message would normally pass). In turn, the function of engaging in the call control process may then involve the session management server engaging in third party call control to establish a communication session between B and A. The session management server may take the form of an IP Multimedia Subsystem (IMS) Call Session Control Function (CSCF).

Further, the method may involve maintaining a call state record indicating that A is leaving the voice mail message for B and then referring to that call state record to determine that A is leaving the voice mail message for B upon receiving the call origination message indicating that B is attempting to call A. The function of maintaining the call state record may involve maintaining the call state record in a home CSCF or an IMS Home Subscriber Server (HSS).

The function of connecting A with the voice mail server may further comprise establishing a Real-time Transport Protocol (RTP) session between A and the voice mail server. In turn, the function of engaging in the call control process to connect B with A may involve engaging in SIP signaling to establish an RTP session between B and A. In this or other embodiments, A may comprise a telecommunication device (e.g., telephone, modem, fax machine, etc.) and/or a party operating the device, and B may comprise another telecommunication device and/or a party operating the other device. The term "party" as used herein can thus mean a telecommunication device and/or a person operating the telecommunication device.

In yet another respect, the exemplary embodiment may take the form of a system including (i) a voice mail server and (ii) a call controller communicatively linked with the voice mail server. The call controller in this system may further include program logic that is executable by a processor for (i) detecting that the first party is attempting to call a second party while the second party is leaving a voice mail message at the voice mail server for the first party and (ii) responsively engaging in a call control process comprising connecting the first party with the second party.

As in the methods described above, the function of detecting the attempted call may occur before the voice mail server sends to the first party a notification of the voice mail message. Further, the call control process may include disconnecting the second party from the voice mail server, possibly after first directing the voice mail server to play an announcement to the second party explaining that the second party is about to be connected with the first party. Still further, the call control process may also involve preventing the voice mail server from sending a notification of the voice mail message to the first party.

These as well as other aspects, advantages, and alternatives will become readily apparent to those skilled in the art by reading the following detailed description, with reference where appropriate to the accompanying drawings.

DETAILED DESCRIPTION

Figure 1:
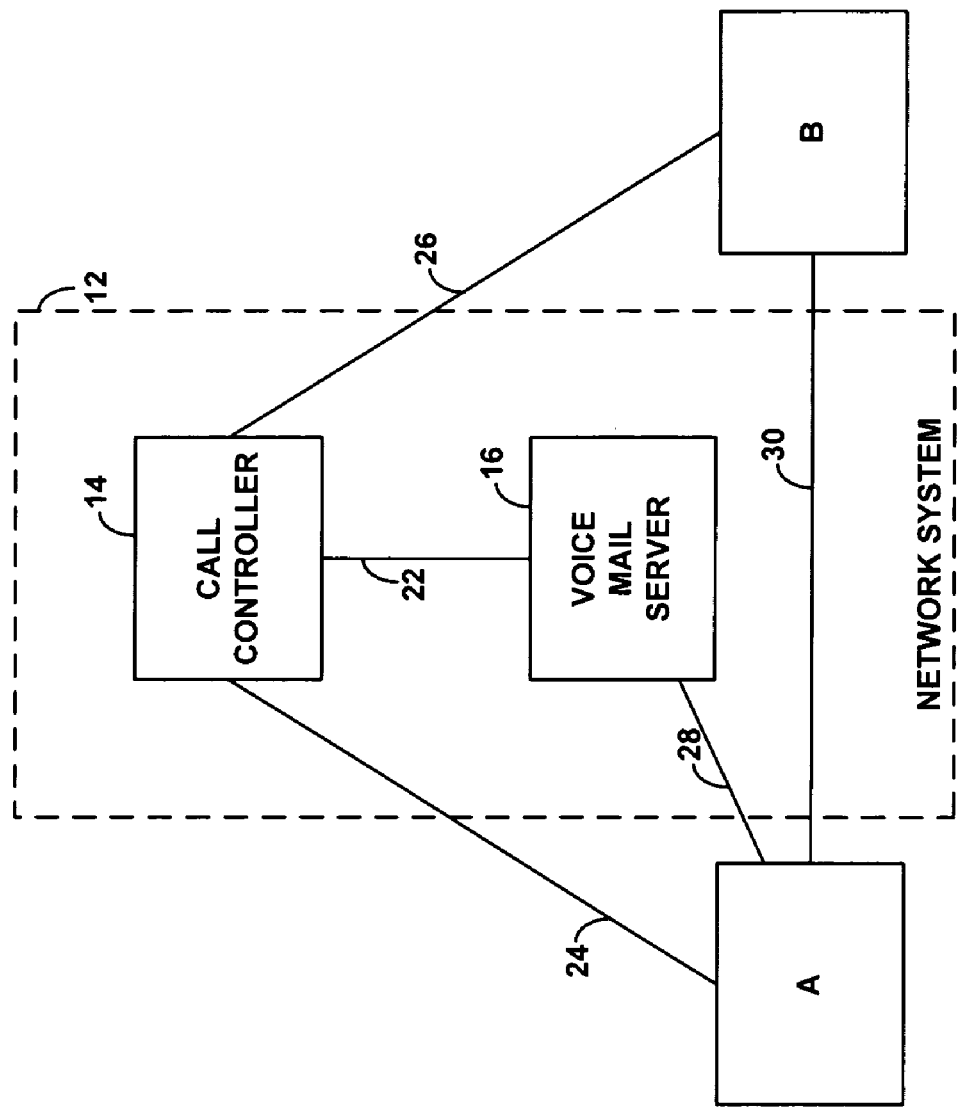
FIG. 1 is a simplified block diagram of a communication system in which an exemplary embodiment of the invention can be implemented.

Referring to the drawings, FIG. 1 is a simplified block diagram depicting an arrangement in which an exemplary embodiment of the invention can be implemented. As shown in the drawing, the arrangement includes a network system 12 comprising a call controller 14 and a voice mail server 16, and the arrangement further includes exemplary parties A and B.

Exemplary communication paths 22-30 are shown between these various entities. In particular, path 22 extends between call controller 14 and voice mail server 16, path 24 extends between call controller 14 and party A, path 26 extends between call controller 14 and party B, path 28 extends between party A and voice mail server 16, and path 30 extends between party A and party B. These communication paths can take any form and can extend over common physical links, such as common networks for instance. Further, although the paths are shown as simple lines, the paths could be more complex, including possibly many other links and other elements, such as proxy servers, gateways, switches, routers, or other nodes, and the links could pass through or include some of the elements shown.

Call controller 14 may be any entity or combination of entities that functions to facilitate call setup and/or call control. In this regard, it will be understood that the term "call" can encompass largely any form of communication session, whether circuit-based, packet-based, wireless, landline, voice, video, or other form of communication session now known or later developed.

By way of example and without limitation, call controller 14 may comprise a switch or gateway that functions to receive and respond to circuit-switched call origination messages and to connect calls between parties, possibly via other switches, and/or a service control point that engages in intelligent network signaling to guide call setup and/or control by one or more switches. Or call controller 14 may comprise a media gateway, media gateway controller, gatekeeper, proxy server, or IMS CSCF, that functions to manage, guide, route, redirect, or otherwise facilitate packet-based call setup and control signaling such as SIP signaling or H.323 signaling for instance.

Call controller 14 will preferably include a network interface for communicating with other entities, such as parties A and B and voice mail server 16. Further, call controller 14 may include a processor (e.g., one or more general or special purpose processors) and data storage (e.g., one or more magnetic, optical, or organic storage elements), and the data storage may contain program instructions executable by the processor to carry out various call-control functions described herein. In an alternative embodiment, some or all of the functions of call controller 14 may be implemented by hardware and/or firmware.

Voice mail server 16 may comprise one or more entities that manage voice mail messaging. As such, voice mail server 16 may similarly include a network interface, a processor, and data storage, and software, firmware, and/or hardware for carrying out various voice mail server functions described herein. For each party subscribing to voice mail service, voice mail server 16 preferably defines a voice mail box and stores an outgoing message prompt and any voice mail messages left for the party. In normal operation, when voice mail server 16 receives a call for a given party, voice mail server 16 may play the party's outgoing message to the caller as a prompt and may then receive and store a voice mail message left by the caller. Voice mail server 16 may then transmit, or trigger, a voice mail notification message (such as an e-mail or SMS based notification message, or a dial-tone stutter or other control signal, for instance), to alert the party of the new message.

FIG. 1 shows the call controller 14 and voice mail server 16 as separate entities. It should be understood, however, that some or all of the functions of call controller 14 and voice mail server 16 can instead be integrated together on a common platform.

As noted above, parties A and B may represent telecommunication devices and/or people operating telecommunication devices. For instance, either or each party may include a landline, wireless, circuit-switched, and/or packet-switched telephone (e.g., POTS phone, cell phone, and/or VoIP phone) or other telecommunication device (e.g., fax machine, computer modem, video conference terminal, etc.), whether or not operated by a person or machine.

Figure 2:
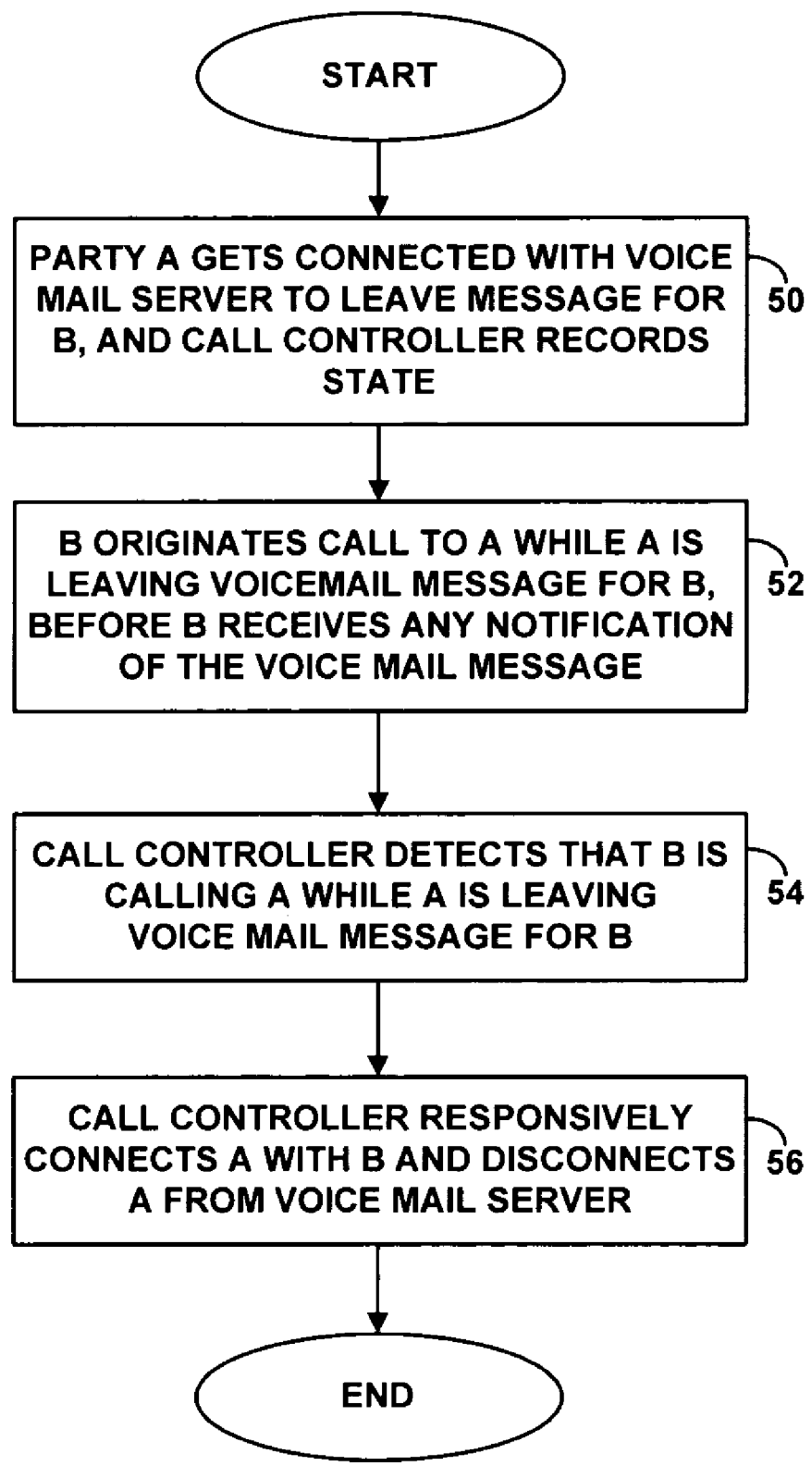
FIG. 2 is a flow chart depicting functions that can be carried out in the arrangement of FIG. 1.

FIG. 2 is flow chart depicting an example of how the inventive process can be carried out in the arrangement of FIG. 1. The example process begins at step 50, when party A gets connected with voice mail server 16 to leave a voice mail message for party B, and call controller 14 records that call status for later reference. In practice, for instance, a call origination message from A may pass over path 24 to call controller 14, requesting setup of a call to B. Call controller 14 may determine, however, that the call cannot or should not be connected to B, because B's line is busy or because B does not answer the call for instance. In response, call controller 14 may then connect A to voice mail server 16 over path 28, or over paths 24 and 22, so that A can leave a message for B. In addition, call controller 14 may create or update a call-state record to indicate that A is leaving a voice mail message for B, or call controller may implicitly have a record that A is leaving a voice mail message for B if call control signaling and/or bearer traffic passes through call controller 14 between A and the voice mail server 16.

At step 52, while A is leaving the voice mail message for B (i.e., A is being connected or has been connected with B's voice mail box to be able to leave a message for B, regardless of whether A is in fact currently speaking a message to B), B next seeks to originate a call to A. In practice, for instance, a call origination message from B may pass over signaling path 26 to call controller 14, requesting setup of a call to A. Preferably, this occurs before voice mail server 16 sends (or causes to be sent) to B any notification of A's voice mail message (if any), and thus before B receives any such notification of A's voice mail message. For instance, a user of B might have seen A's call arriving but may have been unable to get to the phone in time to answer the call, so the user B might immediately try to call A without first receiving a notification that A left a voice mail message for B. Indeed, B's effort to call A may occur at any point in the process of A leaving a voice mail message for B, which means any point in time between (i) the moment the call controller or other entity begins connecting A to the voice mail server to leave a message for B and (ii) the moment A gets disconnected from the voice mail server, regardless of whether the voice mail server is currently recording A's message to B.

At step 54, call controller 14 thus detects that B is attempting to call A while A is leaving a voice mail message for B. To do so, call controller 14 may receive the call origination message or other signal indicative of B's effort to call A, and call controller 14 may refer to its call state record to determine that A is currently leaving a voice mail message for B.

At step 56, in response to detecting that B is attempting to call A while A is leaving a message for B, call controller 14 engages in a call control process to connect A with B and preferably to disconnect A from the voice mail server. In the event A's call with the voice mail server 16 passes through call controller 14 (e.g., via paths 24 and 22), call controller 14 can do this by disconnecting the call leg that extends to the voice mail server 16 (over path 22) and instead connecting A with B through the call controller 14 (via paths 26 and 24). Alternatively, if A's call with the voice mail server does not pass through the call controller 14 (but instead passes, e.g., over path 28), the call controller 14 can signal to the voice mail server 16 (over path 22) to cause the voice mail server to disconnect its call with A, and the call controller 14 can further engage in third party call control to set up a call between A and B (over path 30).

In the exemplary embodiment, the call control process may further involve directing the voice mail server 16 to play an announcement to A, to explain to A that A is about to be connected with B. Further, the announcement could prompt A to agree to the connection with B, and, if A agrees, voice mail server 16 can disconnect A's call and can signal back to call controller 14 to trigger connection of A with B.

Still further, the call control process may involve the voice mail server 16 deleting any extent of voice mail message that A has already left for B. To accomplish this, call controller 14 can send a predefined signaling message to the voice mail server 16 directing the voice mail server to do so, or the voice mail server may be programmed by default to do so in this circumstance. By deleting the message, the voice mail server would then not send a voice mail notification message to B. Thus, this process would prevent a voice mail notification message from being sent to B for A's message. Other methods for preventing a voice mail notification message from being sent to B are possible as well.

Figure 4:
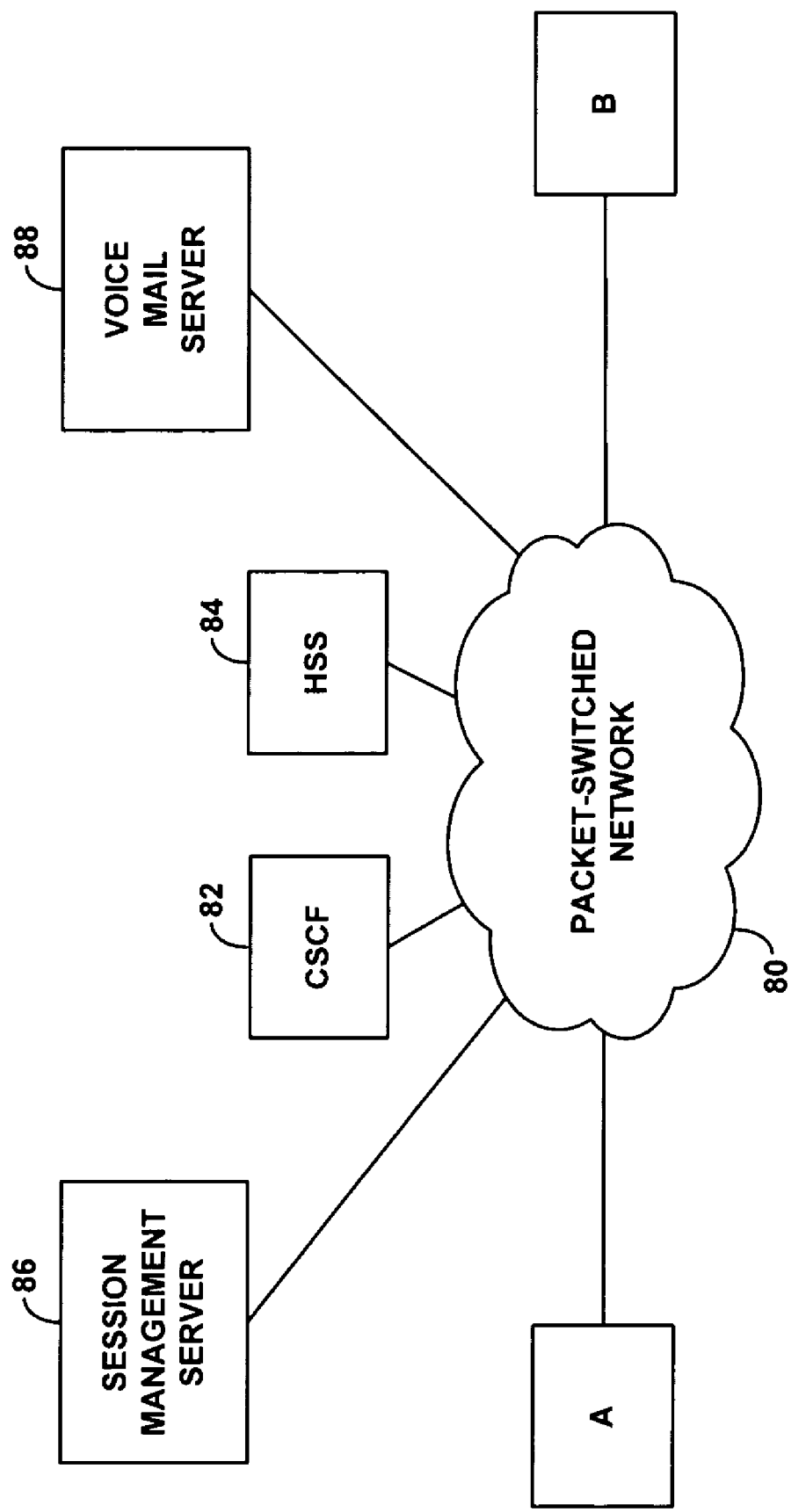
FIG. 4 is a block diagram depicting more specifically another network arrangement in which the exemplary embodiment can be implemented.
Figure 5:
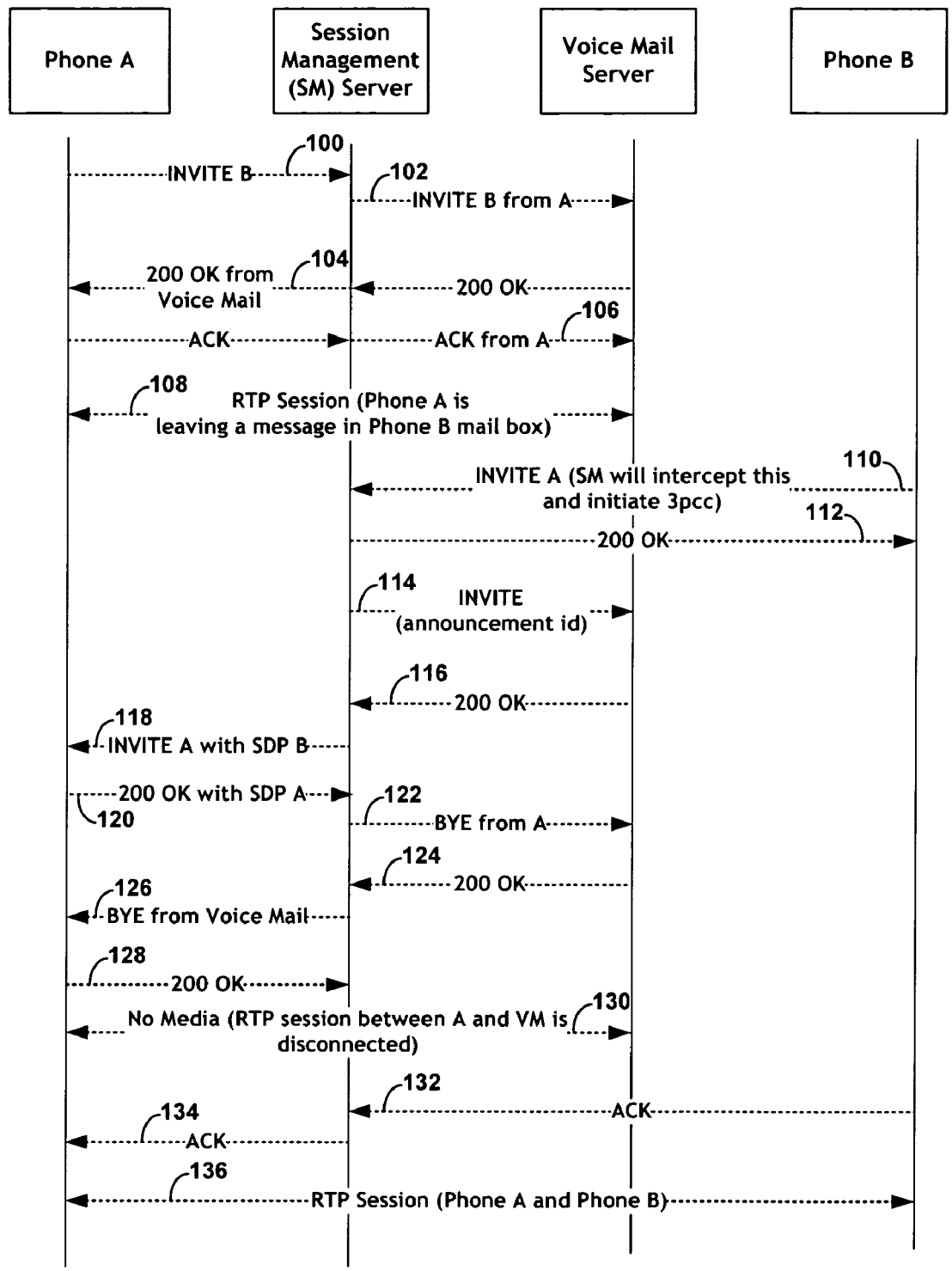
FIG. 5 is a message flow diagram depicting message flow in the network arrangement of FIG. 4.

The arrangement and process depicted by FIGS. 1 and 2 can be implemented in any of a variety of specific network configurations. By way of example, FIG. 3 illustrates implementation in a legacy circuit-switched network, and FIGS. 4 and 5 illustrate implementation in a packet-switched network.

Figure 3:
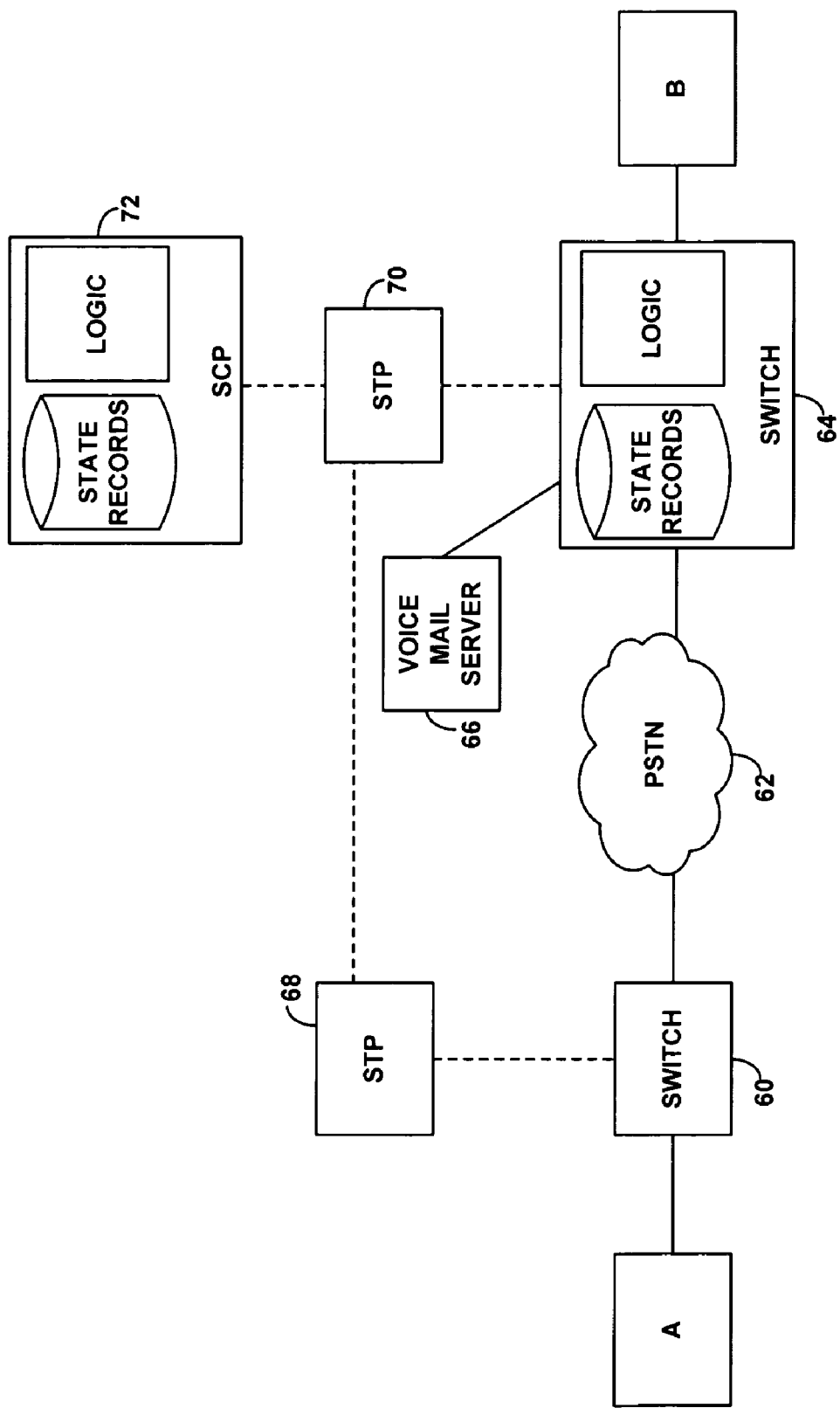
FIG. 3 is a block diagram depicting more specifically a network arrangement in which the exemplary embodiment can be implemented.

Referring to FIG. 3, in the example circuit-switched arrangement, A is connected with and served by a first switch 60, which provides connectivity with the public switched telephone network (PSTN) 62, and B is connected with and served by a second switch 64, which similarly provides connectivity with the PSTN 62 (In an alternative arrangement, A and B could both be served by switch 64.) Switch 64 is further connected with a voice mail server 66, which may be a service node function tied directly with switch 64. In addition, switches 60, 64 are shown connected with signal transfer points (STPs) 68, 70, which provide connectivity with a service control point (SCP) 72. Each of the switches shown can be landline or wireless telephone switches, and thus A and B could be landline or wireless terminals. FIG. 3 shows two example points where the call control function of the present invention: switch 64 and/or SCP 72. Thus, each of these points is shown including call-state record data and logic for carrying out some or all aspects of the inventive process.

In this arrangement, the process begins with A calling B and being connected to voice mail server 66, perhaps because B fails to answer the call in time. In practice, for instance, A may dial B's number or otherwise send a call origination message to switch 60, seeking to set up a call to B, and switch 60 may responsively engage in ISUP signaling via STPs 68, 70 with switch 64 (effectively passing the substance of B's call origination message along to switch 64) in an effort to set up the call. Switch 64 may then attempt to set up the call to B but may fail. In response, switch 64 may then apply call processing logic that dictates setting up the call from A instead to voice mail server 66, to allow A to leave a message for B.

Alternatively or additionally, switch 64 may encounter an intelligent network trigger point that causes switch 64 to signal via STP 70 to SCP 72, and SCP 72 may then apply call processing logic that dictates setting up the call from A to voice mail server 66, and SCP 72 may responsively send switch 64 a directive to set up the call from A to voice mail server 66. Consequently, switch 64 may engage in ISUP signaling with voice mail server 66 to set up the call to the voice mail server 66. Further, switch 64 and/or SCP 72 may update a call-state record indicating that the call from A to B is currently connected from A to voice mail server 66.

While A is connected with voice mail server 66, B then originates a call to A. For instance, B may dial A's number or otherwise send a call origination message to switch 64, seeking to set up a call to A. When switch 64 receives this call origination message from B seeking to set up a call to A, switch 64 may then check its call state records and thereby determine that A is currently connected with voice mail server to leave a voice mail message for B. Logic in switch 64 may then dictate, in accordance with the invention, that switch 64 should connect A with B and disconnect A's call with the voice mail server. Alternatively, switch 64 may encounter an intelligent network trigger point that causes switch 64 to signal to SCP 72, and SCP 72 may apply call processing logic and then direct switch 64 to connect A with B and disconnect A's call with the voice mail server.

In response, switch 64 may then engage in ISUP signaling with voice mail server 66 to direct the voice mail server to disconnect the call between A and the voice mail server, in much the same way as switch 64 might do if A had hung up and thus ended its call with the voice mail server. Further, switch 64 may include in its ISUP signaling a parameter value in response to which voice mail server 66 is programmed to play an announcement to A informing A that A is about to be connected with B and perhaps to cause voice mail server 66 to delete any extent of voice mail message that A has left for B already. Alternatively, switch 64 may itself play an announcement to A informing A that A is about to be connected with B.

Once the call leg between switch 64 and voice mail server 66 is disconnected, switch 64 may connect the existing call from A through to B, thus allowing A and B to talk with each other.

Referring next to FIG. 4, in the example packet-switched arrangement, A and B are both shown as nodes on a packet-switched network 80. A and/or B may be connected with packet-switched network through any of a variety of access gateways and networks (not shown), such as cellular radio access networks, local area networks, or others. For instance, A and B may both be cellular wireless communication devices having EV-DO or other wireless-packet data connectivity.

Shown sitting as other nodes on packet-switched network are an IMS CSCF 82, and an IMS HSS 84. In an IMS system, the HSS may hold subscriber profile (e.g., service subscription) records and call state records, and the CSCF functions as a proxy server through which call setup and control signaling, such as SIP signaling, passes on the way between signaling endpoints. When a signaling message passes through the CSCF, the CSCF may detect the message and responsively query the HSS to determine whether special call processing should be applied. Further, in many cases, the CSCF may further shunt call signaling messages out to various servers for further call processing, possibly in view of HSS profile directives or default CSCF logic. For instance, a CSCF might route a SIP INVITE to a prepaid call processing server to facilitate real-time account tracking, and the prepaid call processing server may route the SIP INVITE back to the CSCF for routing to its intended destination.

Further sitting as nodes on the packet-switched network 80 are a session management server ("session manager") 86 and a voice mail server 88. In this arrangement, when SIP signaling is passing between entities on the packet-switched network, CSCF 82 may shunt the messaging to session manager 86, and session manager 86 may then function as the call controller described above. Session manager 86 may update call state records in HSS 84, for instance, when a call is connected to a particular node, such as voice mail server 88. Further, session manager 86 may query HSS 84 to determine call state when faced with an attempt to set up a call.

FIG. 5 is a message flow diagram depicting an example of how the inventive process may occur in the packet-switched arrangement of FIG. 4. As shown in FIG. 5, at step 100, A sends a SIP INVITE to B, seeking to set up a call to B. The INVITE passes via CSCF 82 to session manager 86, and from there to B. When B does not respond to the INVITE, session manager 86 may then engage in call control signaling to instead set up A's call to voice mail server, so that A can leave a message for B. For instance, at step 102, session manager 86 may forward A's INVITE to voice mail server 88; at step 104, session manager 86 may forward a SIP 200 OK message from the voice mail server 88 to A; and at step 106, session manager 86 may forward a SIP ACK from A to the voice mail server, thus setting up A's call as an RTP session 108 between A and the voice mail server. Further, session manager 86 may record this call state in HSS 84.

As shown next at step 110, while the RTP session is in place between A and the voice mail server, B sends an INVITE to A, seeking to set up a call to A. This INVITE similarly passes via CSCF 82 to session manager 86. However, session manager 86 then determines from the HSS call state records that A is currently leaving a voice mail message for B at voice mail server 88. Thus, in response, session manager instead initiates the inventive call control process.

In particular, at step 112, session manager 86 sends a 200 OK to B, in response to B's INVITE message, thus working to set up B's call. Further, at step 114, session manager 86 sends an INVITE to voice mail server 88, providing in the INVITE a special announcement-ID header parameter that will direct the voice mail server 88 to play an announcement to A indicating that A is about to be connected to the party to whose voice mail box A is currently connected. In the exemplary embodiment, session manager 86 can send this announcement-ID by including in the INVITE a request-URI in the form sip:announcementid@vmserver.realm.com, where "announcementid" may be an HTTP URL and/or other information necessary to identify the desired announcement for voice mail server 88 to play. At step 116, voice mail server then sends a 200 OK to session manager 86, accepting the invitation to play the announcement to A.

At step 118, session manager 86 then sends an INVITE to A, providing A with session description information (SDP parameters) regarding B, perhaps passing B's INVITE along to A. In response, at step 120, A sends to session manager 86 a 200 OK, providing session description parameters regarding A, thus establishing As acceptance to receive B's call.

At step 122, session manager then sends a SIP BYE message on behalf of A to voice mail server 88, which voice mail server 88 would treat as though A sought to end the RTP session between A and the voice mail server. Thus, at step 124, voice mail server 88 responsively sends a 200 OK to session manager 86. In addition, at step 126, session manager 86 similarly sends a BYE on behalf of the voice mail server to A, which A would treat as though the voice mail server sought to end the RTP session between A and the voice mail server. Thus, at step 128, A responsively sends a 200 OK to session manager 86. As shown at step 130, the RTP session between A and the voice mail server is thereby disconnected.

At step 132, following the 200 OK sent from session manager 86 to B at step 112, B sends a SIP ACK to the session manager 86. Once the session manager 86 receives that SIP ACK, the session manager 86 then sends a SIP ACK to A, at step 134. Thus, as shown at step 136, an RTP session between A and B is thereby established, and A may then communicate with B.

An exemplary embodiment of the present invention has been described above. Those skilled in the art will understand, however, that changes and modifications may be made to this embodiment without departing from the true scope and spirit of the present invention, which is defined by the claims.

We claim:

1. In a network system that facilitates call connection between a first party and a second party, a method comprising:
   at a call controller that comprises a switch or gateway, establishing a call state record indicating that the second party is connected with a voice mail server to leave a voice mail message for the first party;
   while the second party is leaving the voice mail message for the first party, the call controller detecting that the first party calling the second party, wherein the detecting occurs before any notification of the voice mail message is sent to the first party; and
   responsive to detecting that the first party is calling the second party while the second party is leaving the voice mail message for the first party as indicated by the call state record, the call controller engaging in a call control process comprising disconnecting the second party from the voice mail server and connecting the first party with the second party.

2. The method of claim 1, wherein the call control process further comprises playing an announcement to the second party before disconnecting the second party from the voice mail server.

3. The method of claim 2, wherein the announcement comprises a voice announcement explaining that the second party is going to be connected with the first party.

4. In a network system that facilitates call connections, a method comprising:
   connecting a first party, A, with a voice mail server to allow A to leave a voice mail message for a second party, B, and maintaining a call state record that indicates A is connected with the voice mail server to leave the voice mail message for B;

the voice mail server beginning to receive the voice mail message from A while A is leaving the voice mail message for B at the voice mail server, a call control server receiving a call origination message indicating that B is calling A, wherein the call origination message is generated by B without B first receiving a notification that A is leaving the voice mail message for B; and the call control server detecting that, while A is leaving the voice mail message for B as indicated by the call state record, the call control server received the call origination message indicative of B is calling A responsive to the detecting, the call server engaging in a call control process comprising connecting B with A.

5. The method of claim 4, wherein the call control process further comprises disconnecting A from the voice mail server.

6. The method of claim 5, wherein the call control process further comprises playing an announcement to A before disconnecting A from the voice mail server.

7. The method of claim 6, wherein the announcement is a voice announcement explaining that B is about to be connected with A.

8. The method of claim 4, wherein the call control process further comprises preventing the voice mail server from sending a voice notification of the voice mail message to B.

9. The method of claim 4, wherein receiving a call origination message indicating that B is calling A comprises receiving a Session Initiation Protocol (SIP) INVITE message transmitted from B, the SIP INVITE message requesting setup of a call between B and A.

10. The method of claim 4, wherein the call control server comprises a session management server, wherein receiving the call origination message comprises intercepting the call origination message at the session management server, and wherein engaging in the call control process comprising connecting B with A comprises the session management server engaging in third party call control to establish a communication session between B and A.

11. The method of claim 10, wherein the session management server comprises an IP Multimedia Subsystem (IMS) Call Session Control Function (CSCF).

12. The method of claim 4, further comprising:

the call control server referring to the call state record to determine that A is leaving the voice mail message for B upon receiving the call origination message indicating that B is calling A.

13. The method of claim 12, wherein maintaining the call state record comprises maintaining the call state record in an element selected from the group consisting of (i) a Call Session Control Function (CSCF) and (ii) an IP Multimedia Subsystem (IMS) Home Subscriber Server (HSS).

14. The method of claim 4, wherein connecting A with the voice mail server comprises establishing a Real-time Transport Protocol (RTP) session between A and the voice mail server.

15. The method of claim 4, wherein engaging in the call control process comprising connecting B with A comprises engaging in Session Initiation Protocol (SIP) signaling to establish a Real-time Transport Protocol (RTP) session between B and A.

16. The method of claim 4, wherein party A comprises a first cell phone, and wherein party B comprises a second cell phone.

17. A system operable to provide call connection between a first party and a second party, the system comprising:

a voice mail server provisioned with a voice mail box for a first party; and a call controller communicatively linked with the voice mail server, wherein the call controller includes program logic executable by a processor for:

(i) establishing a call state record indicating that the second party is connected with a voice mail server to leave a voice mail message for the first party, (ii) while the second party is leaving a voice mail message for the first party, detecting the first party calling the second party, wherein the detecting occurs before any notification of the voice mail message is sent to the first party, and (iii) responsive to detecting that the first party is calling the second party while the second party is leaving the voice mail message for the first party as indicated by the call state record, engaging in a call control process comprising connecting the first party with the second party.

18. The system of claim 17, wherein the call control process further comprises disconnecting the second party from the voice mail server.

19. The system of claim 18, wherein the call control process further comprises directing the voice mail server to play an announcement to the second party before disconnecting the second party from the voice mail server.

20. The system of claim 17, wherein the call control process further comprises preventing the voice mail server from sending a notification of the voice mail message to the first party.

* * * * *